United States Patent
Boyd et al.

(10) Patent No.: US 12,095,830 B2
(45) Date of Patent: Sep. 17, 2024

(54) METHOD AND SYSTEM FOR INTEGRATING INTERNET OF THINGS (IOT) DEVICES AND MOBILE CLIENT AUDIOVISUAL INTO A VIDEO CONFERENCING APPLICATION

(71) Applicant: ARRIS Enterprises LLC, Suwanee, GA (US)

(72) Inventors: Christopher Robert Boyd, Chalfont, PA (US); Albert F. Elcock, West Chester, PA (US); Christopher S. Del Sordo, Souderton, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 271 days.

(21) Appl. No.: 17/583,291

(22) Filed: Jan. 25, 2022

(65) Prior Publication Data

US 2022/0286486 A1    Sep. 8, 2022

Related U.S. Application Data

(60) Provisional application No. 63/155,547, filed on Mar. 2, 2021.

(51) Int. Cl.
*H04N 7/15*       (2006.01)
*H04L 65/1069*    (2022.01)
(Continued)

(52) U.S. Cl.
CPC ...... *H04L 65/1093* (2013.01); *H04L 65/1069* (2013.01); *H04L 65/403* (2013.01); *H04N 7/15* (2013.01); *G16Y 10/75* (2020.01)

(58) Field of Classification Search
None
See application file for complete search history.

(56) References Cited

U.S. PATENT DOCUMENTS 10,044,980 B1 *   8/2018   Graham ................ H04L 65/403
10,771,740 B1 *   9/2020   Reynolds ................ H04N 7/15
(Continued)

FOREIGN PATENT DOCUMENTS

KR    10-2019-0048293 A    5/2019

OTHER PUBLICATIONS

Notification of Transmittal of the International Search Report (Forms PCT/ISA/220 and PCT/ISA/210) and the Written Opinion of the International Searching Authority (Form PCT/ISA/237) issued Apr. 22, 2022, by the International Application Division Korean Intellectual Property Office in corresponding International Application No. PCT/US2022/013600. (9 pages).

*Primary Examiner* — Quoc D Tran
(74) *Attorney, Agent, or Firm* — Panitch Schwarze Belisario & Nadel LLC

(57) ABSTRACT

A method, a server, and a non-transitory computer readable medium are disclosed for sharing content. The method includes running, on a server, a video conferencing application, the video conferencing application configured to share audiovisual content between one or more first devices and the server; establishing, on the server, a video conferencing session, the video conferencing session connecting a second device to the server; receiving, on the server, content from the second device; and sharing, by the server, the content received from the second device joining the video conferencing session as a new participant with the one or more first devices on the video conferencing application.

20 Claims, 8 Drawing Sheets

(51) Int. Cl.
    *H04L 65/1093*     (2022.01)
    *H04L 65/403*     (2022.01)
    *G16Y 10/75*     (2020.01)

(56) References Cited

U.S. PATENT DOCUMENTS

| | | |
|---|---|---|
| 10,771,741 B1 * | 9/2020 | Reynolds ................. H04N 7/15 |
| 2010/0037151 A1 | 2/2010 | Ackerman et al. |
| 2011/0157298 A1 * | 6/2011 | Huang ..................... H04N 7/15 |
| | | 348/14.08 |
| 2014/0168345 A1 * | 6/2014 | Vernick ................... H04N 7/15 |
| | | 348/14.02 |
| 2014/0347435 A1 | 11/2014 | Barazany et al. |
| 2015/0244977 A1 | 8/2015 | Sherburne |
| 2020/0382637 A1 * | 12/2020 | Cranfill ................. G06F 21/604 |
| 2022/0070227 A1 * | 3/2022 | Del Sordo .......... H04L 65/1069 |

\* cited by examiner

METHOD AND SYSTEM FOR INTEGRATING INTERNET OF THINGS (IOT) DEVICES AND MOBILE CLIENT AUDIOVISUAL INTO A VIDEO CONFERENCING APPLICATION

TECHNICAL FIELD

The present disclosure generally relates to a method and system for sharing content, and more particularly, to a method and system for integrating Internet of Things (IoT) devices and mobile client audiovisual into a video conferencing application by rendering media content of the IoT device in a video conferencing session or video conference call as a new participant, and wherein, for example, the new participant can be identified by user's name and media type.

BACKGROUND

Consumers utilize video conferencing applications for both business and personal use on a daily basis. Media server and Internet Protocol (IP) client devices can also support video conferencing via a combination of on-board and connected devices. Video conferencing services can also integrate with IoT devices via wireless protocols, for example, via a local area network (LAN), Bluetooth, and/or IEEE 802.15.4 based protocols such as ZigBee RF4CE (Radio Frequency for Consumer Electronics) and ZigBee.

Current video conferencing applications cannot source content from a consumer's IoT devices or mobile device in a graceful manner other than sharing of the content in a current participant screen. For example, this means that the current participant must share his/her desktop's IoT rendering of the media content, which requires compositing of the external device's media content and then combining the current participant's media content rendering with the desktop's IoT media content window, which can results in a degraded performance. By taking the media content directly from the IoT or Mobile device and transmitting directly over the network to other participants in a separate participant window, this allows for better performance and feature enhancement.

It would be desirable to enhance the media viewing capabilities of video conferencing applications to integrate viewing of media sourced, for example, from IoT devices and mobile clients, for example, smart doorbells, security cameras, webcams, Xbox®, or smart phones, for example, an iPhone®. The media from the IoT devices and the mobile devices can join a video conferencing session or conference call as a new participant, for example, by user's name and media type.

SUMMARY

In addition, it would be desirable to extend video conferencing applications to provide video conference participants with the controls necessary to add content from IoT devices and smart devices as a participant in video conference calls and/or presentations via, for example, a smart media device.

In accordance with an aspect, a method is disclosed for sharing content, the method comprising: running, on a server, a video conferencing application, the video conferencing application configured to share audiovisual content between one or more first devices and the server; establishing, on the server, a video conferencing session, the video conferencing session connecting a second device to the server; receiving, on the server, content from the second device; and sharing, by the server, the content received from the second device joining the video conferencing session as a new participant with the one or more first devices on the video conferencing application.

In accordance with a further aspect, a server is disclosed comprising: an operating system; and a processor configured to: run a video conferencing application, the video conferencing application configured to share audiovisual content between the one or more first devices and the server; establish a video conferencing session, the video conferencing session connecting a second device to the server; receive content from the second device; and share the content received from the second device joining the video conferencing session as a new participant with the one or more first devices on the video conferencing application.

In accordance with an another aspect, a non-transitory computer readable medium is disclosed having instructions operable to cause one or more processors to perform operations for sharing content, comprising: running, on a server, a video conferencing application, the video conferencing application configured to share audiovisual content between one or more first devices and the server; establishing, on the server, a video conferencing session, the video conferencing session connecting a second device to the server; receiving, on the server, content from the second device; and sharing, by the server, the content received from the second device joining the video conferencing session as a new participant with the one or more first devices using the video conferencing application.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
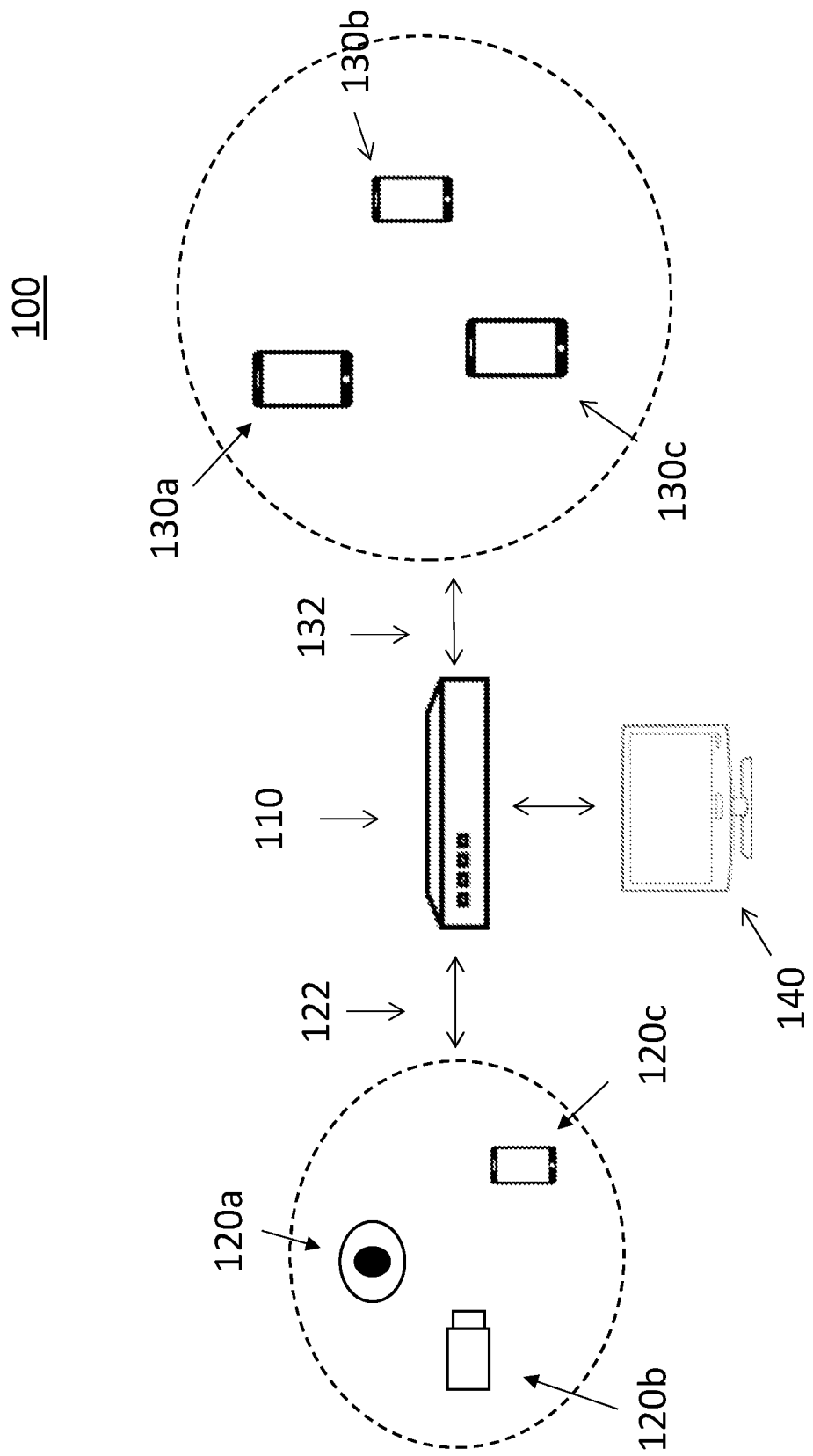
FIG. 1 is an illustration of an exemplary network environment for a method and system for integrating Internet of Things (IoT) devices and mobile client audiovisual (AV) into a video conferencing application in accordance with an exemplary embodiment.

System for Integrating IoT Devices and Mobile Devices into Video Conferencing Application FIG. 1 is an illustration of an exemplary network environment 100 for a method and system for integrating Internet of Things (IoT) devices 120 and audiovisual (AV) from a mobile client 130 into a video conferencing application 142 in accordance with an exemplary embodiment. In accordance with an embodiment, the video conferencing application 142 can be running on a server, for example, a smart media device (SMD) 110. The video conferencing application 142 can be, for example, any existing application that can allow people at two or more locations to see and hear each other at the same time, using computer and communications technology. For example, the video conferencing application can be a cloud based-application such as Skype for Business, Zoom, Cisco WebEx, Join.me, RingCentral Meetings, and/or Google Hangouts.

In accordance with an exemplary embodiment, the smart media device 110 can include, for example, a set-top box or media player configured to deliver content, a smart speaker, a voice or a visual smart assistant, an IoT hub, and a remote control in a single device. The smart media device 110 can also act, as a modem, router, and/or multimedia terminal adapter (MTA) device configured to provide voice, data, and video services.

In accordance with an exemplary embodiment, the smart media device 110 can provide, for example, video and/or data services to be exchanged between one or more IoT devices 120a, 120b, 120c and one or more mobile clients 130a, 130b, 130c as disclosed herein. The network environment 100 can also include a display device 140, for example, a television or digital screen. In accordance with an exemplary embodiment, the display device 140 can be, for example, a television or a high resolution digital television with, for example, an enhanced sound system for viewing audiovisual or media presentations.

In accordance with an exemplary embodiment, the one or more IoT devices 120a, 120b, 120c can be configured to communicate with the smart media device 110 via a network 122, for example, a wireless network. The wireless network can be, for example, via wireless protocols such as WiFi, Bluetooth, and IEEE 802.15.4 based protocols such as ZigBee RF4CE (Radio Frequency for Consumer Electronics) and ZigBee. The one or more IoT devices 120a, 120b, 120c can include, for example, consumer devices in the home such as smart doorbells, security cameras, webcams, Xboxes, iPhones, smart watches, IP cameras, and/or in home medical devices.

In accordance with an exemplary embodiment, the one or more mobile devices 130a, 130b, 130c, can be configured to communicate with the smart media device 110 via a network 132, for example, a local area network (LAN) and/or wireless network utilizing an IEEE 802.11 specification. The local area network (LAN), for example, can include wired and/or wireless connections, for example, via Ethernet and/or WiFi. The one or more mobile devices 130a, 130b, 130c can include smart phones, for example, iPhones, smart TVs, computers, mobile devices, tablets, or any other device configured to communicate with the smart media device 110.

Figure 2:
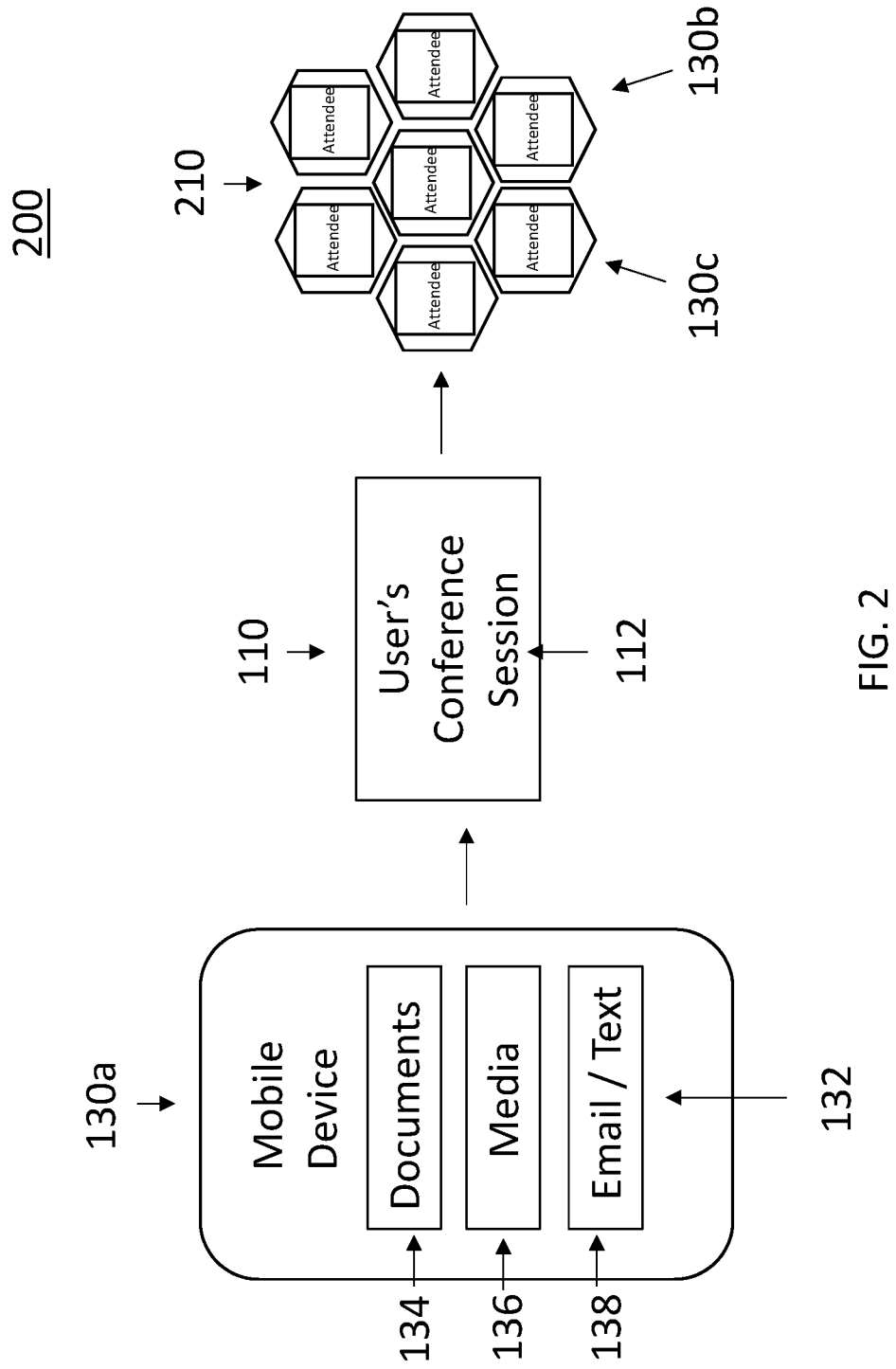
FIG. 2 is an illustration of an exemplary network environment of sharing media from a mobile device in accordance with an exemplary embodiment.

FIG. 2 is an illustration of an exemplary network environment 200 of sharing media from a mobile device 130a in accordance with an exemplary embodiment. As shown in FIG. 2, the network environment 200 can include a mobile device 130a, a smart media device 110, and one or more attendees 210. Each of the plurality of attendees 210 may have a mobile device 130b, 130c. However, one or more of the attendees 210 may not have a mobile device 130b. In accordance with an exemplary embodiment, the smart media device 110 includes a video conferencing application 112 that is configured to provide the attendees 210, for example, a plurality of video conference participants with the ability to view the content hosted and/or running on one or more of the IoT devices 120a, 120b, 120c, and/or one or more of the mobile clients (or mobile devices) 130a, 130b, 130c.

The one or more attendees 210 can be at a conference, for example, in the same location, or alternatively, the one or more attendees 210 can be at different locations, for example, a home, an office, a conference room, and/or a medical office. As shown in FIG. 2, the mobile client 130a can include content 132 such as documents 134, media 136, and/or email or text 138 that can be forwarded to and shared with the smart media device 110 and provided to the one or more attendees 210 via a mobile client 130b and/or a display device 140 (FIG. 1).

Figure 3:
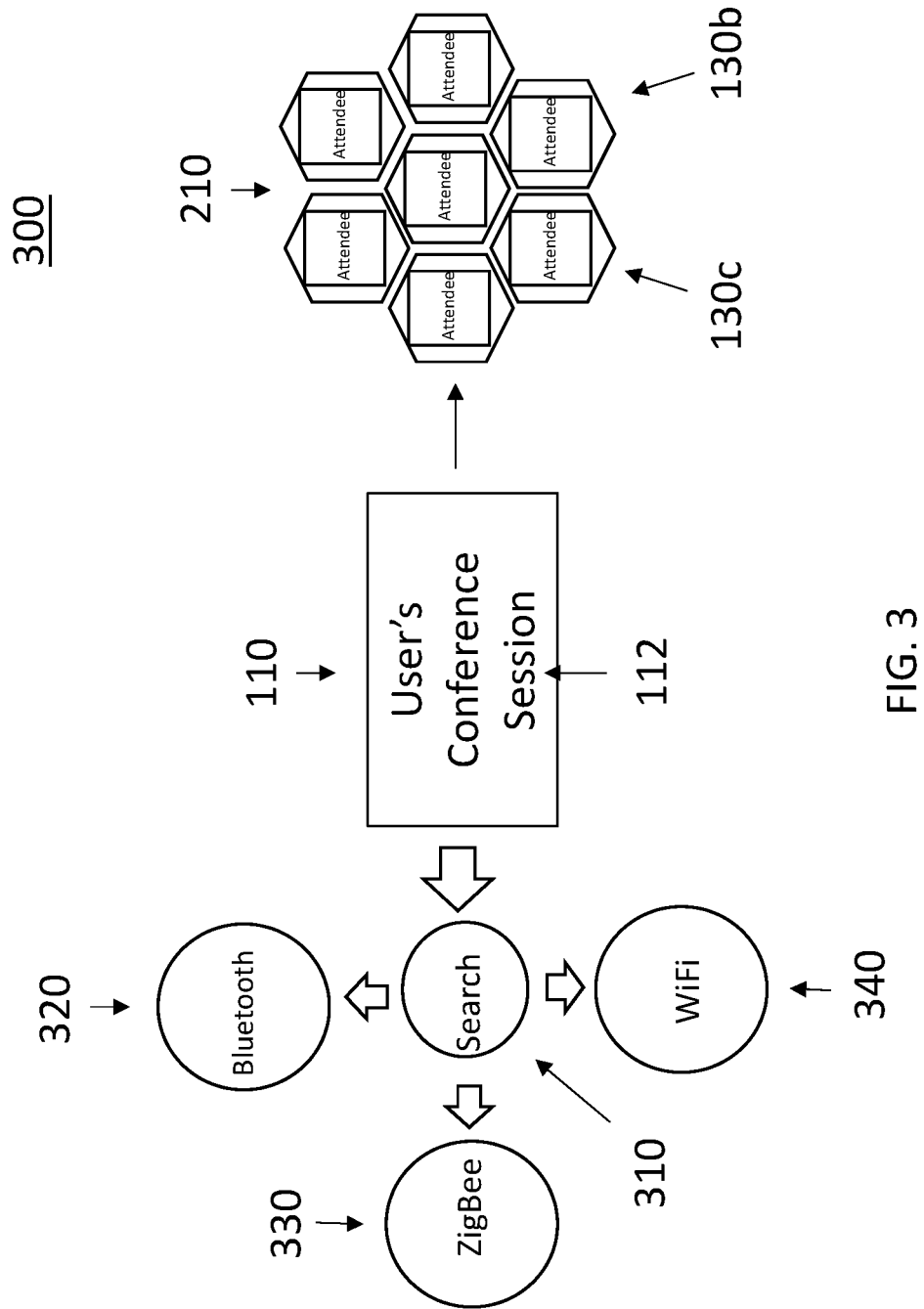
FIG. 3 is an illustration of an exemplary network environment of a conference session scans available mediums for Internet of Things (IoT) devices in accordance with an exemplary embodiment.

FIG. 3 is an illustration of an exemplary network environment 300 of a conference session in which the video conferencing application 112 of the smart media device 110 is configured to search (or scan) 310 available mediums 320, 330, 340, for Internet of Things (IoT) devices 120a, 120b, 120c and/or mobile devices 130a, 130b, 130c. In accordance with an exemplary embodiment, the video conference application 112 can be configured to search 310 and sense IoT devices 120a, 120b, 120c, and/or mobile devices 130a, 130b, 130c, that are resident on the available mediums 320, 330, 340. For example, the available mediums 320, 330, 340 can include, for example, Bluetooth 320, ZigBee 330, or WiFi 340.

In accordance with an exemplary embodiment, each of the one or more IoT devices 120a, 120b, 120c and/or mobile devices 130a, 130b, 130c discovered via the one more mediums 320, 330, 340 can be displayed by the video conferencing application 112 as a list of discovered IoT devices 120a, 120b, 120c and/or mobile devices 130a, 130b, 130c as a source of audio and/or video content. Each of the one or more discovered IoT devices 120a, 120b, 120c, and/or mobile devices 130a, 130b, 130c, can be displayed, for example, on a control interface, for example, a video conference application session interface. The control interface can be, for example, any suitable type of display for displaying data on either the smart media device 110 and/or, alternatively, on one or more of the mobile clients 130a, 130b, 130c. The data displayed can include for example, a video participant's name or identifier (ID), an IoT or mobile device name or identifier, for example, "Bob's iPhone", and a media type, for example, video, audio, etc.

In accordance with an exemplary embodiment, the control interface can allow, for example, a user to connect the smart media device 110 to the IoT devices 120a, 120b, 120c and/or mobile device 130a, 130b, 130c, and the corresponding video conference session. In addition, the control interface can be configured to select the content, for example, the audio content and/or media content that is to be shared with the one or more attendees 210 via the smart media device 110. For example, the shared content could be from a video camera (or IP camera), a smart doorbell, or a home medical device 120a, 120b, 120c and/or mobile device 130a, 130b, 130c.

In accordance with an exemplary embodiment, the content from the IoT device 120a, 120b, 120c can be added to the video conferencing session as a new participant, for example, a new IoT participant. See, generally, U.S. Pat. Nos. 8,395,653; 8,405,705; and 9,204,096; and U.S. Pub. Pat. Appl. No. 2014/0280595 herein incorporated by reference, among others, that disclose various ways to register and authenticate participants. In addition, the control interface can be configured to control, for example, aspects of the content from the IoT device 120a, 120b, 120c, for example, volume, brightness, etc.

Figure 4:
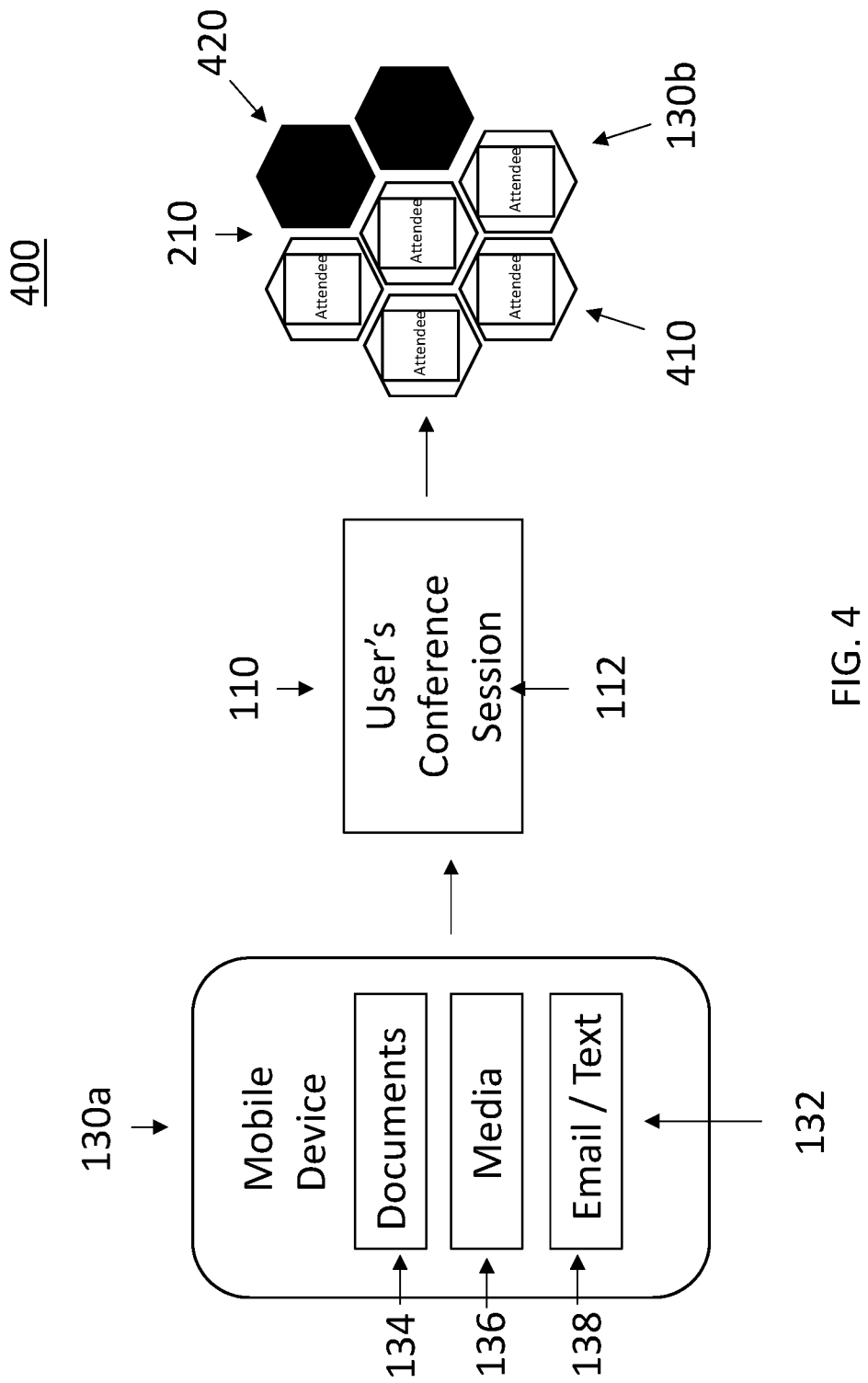
FIG. 4 is an illustration of an exemplary network environment of selectively sharing content with conference attendees in accordance with an exemplary embodiment.

FIG. 4 is an illustration of an exemplary network environment 400 in which content is selectively shared with conference attendees 210 in accordance with an exemplary embodiment. As shown in FIG. 4, the smart media device 110 can receive content from, for example, a mobile client 130a (or IoT device 120a, 120b, 120c). The content 132 can include documents 134, media 136, and/or email or text 138. In accordance with an exemplary embodiment, the content 132 can be selectively shared with only a portion of the one or more attendees 210. For example, the one or more of the attendees 210 can include attendees and corresponding mobile devices 410 that can view the content or media 132 and attendees and corresponding mobile device 420 that will not be able to view the content or media 132. For example, such content 132 may be confidential such that only certain attendees 210 should have access.

In accordance with an exemplary embodiment, for educational purposes, each of the teachers or educators may not need and/or should not be able to view the content or media. In addition, for shared medial video conference calls, it may not be appropriate, for example, for one or more attendees 210 to view personal or private information.

Figure 5:
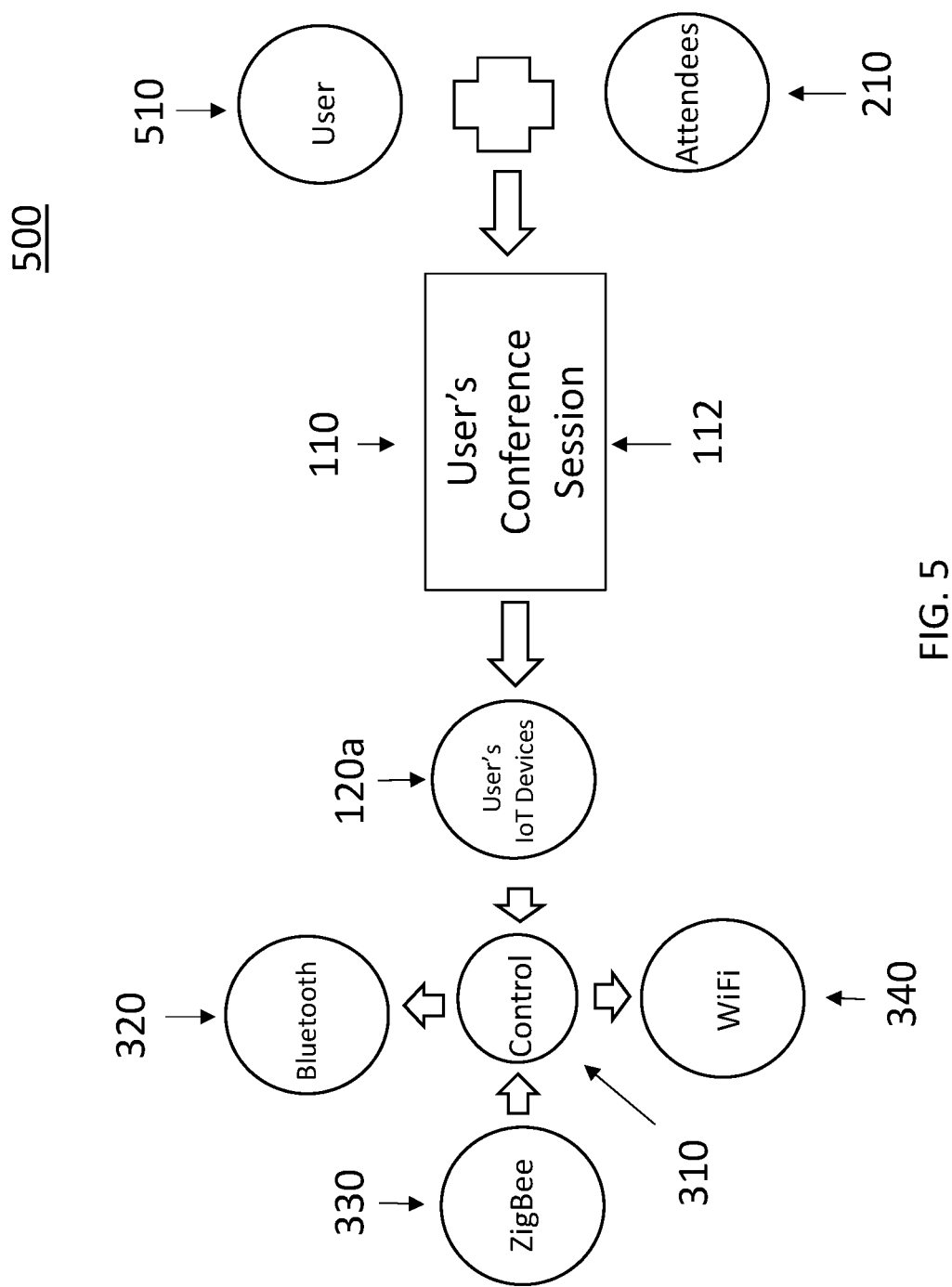
FIG. 5 is an illustration of an exemplary network environment of controlling an Internet of Things (IoT) device from within a conference session in accordance with an exemplary embodiment.

FIG. 5 is an illustration of an exemplary network environment of controlling an Internet of Things (IoT) device 120a, 120b, 120c from within a conference session in accordance with an exemplary embodiment. In accordance with an exemplary embodiment, the video conference application 112 running on the smart media device 110 can provide the capability for a user (or consumer) 510 to connect one or more IoT devices 120a, 120b, 120c to the conference session. For example, at any point before or during a video conference call, the user 510 may initiate a scan during which the video conference application 112 will provide a list of all available IoT devices 120a (or mobile devices) and corresponding media and documents that are available for sharing with one or more attendees 210. In accordance with an exemplary embodiment, the video conferencing application 112 can be a smart media device (SMD) middleware, which has the ability to sense IoT devices 120a, 120b, 120c and/or mobile devices 130a, 130b, 130c that are resident on the LAN 122, 132 and provide the results via a video conference application session interface. In accordance with an exemplary embodiment, the video conference application session interface is an application programming interface (API) to the video conferencing application 112 which can be displayed to the user 510 (or consumer) via, for example, on a mobile device 130a or directly on the smart media device 110.

In accordance with an exemplary embodiment, the user or consumer 510 can then select, for example, the IoT device 120a (or mobile device 130a, 130b, 130c) to connect to the video conference session and begin receiving audio content and/or video content from the IoT device 120a (or mobile device 130a, 130b, 130c). The IoT device 120a can be included as a separate "IoT Participant", and the user 510 can select which media content on the IoT device 120a to render or display as a video conference participant.

Method for Sharing Content

Figure 6:
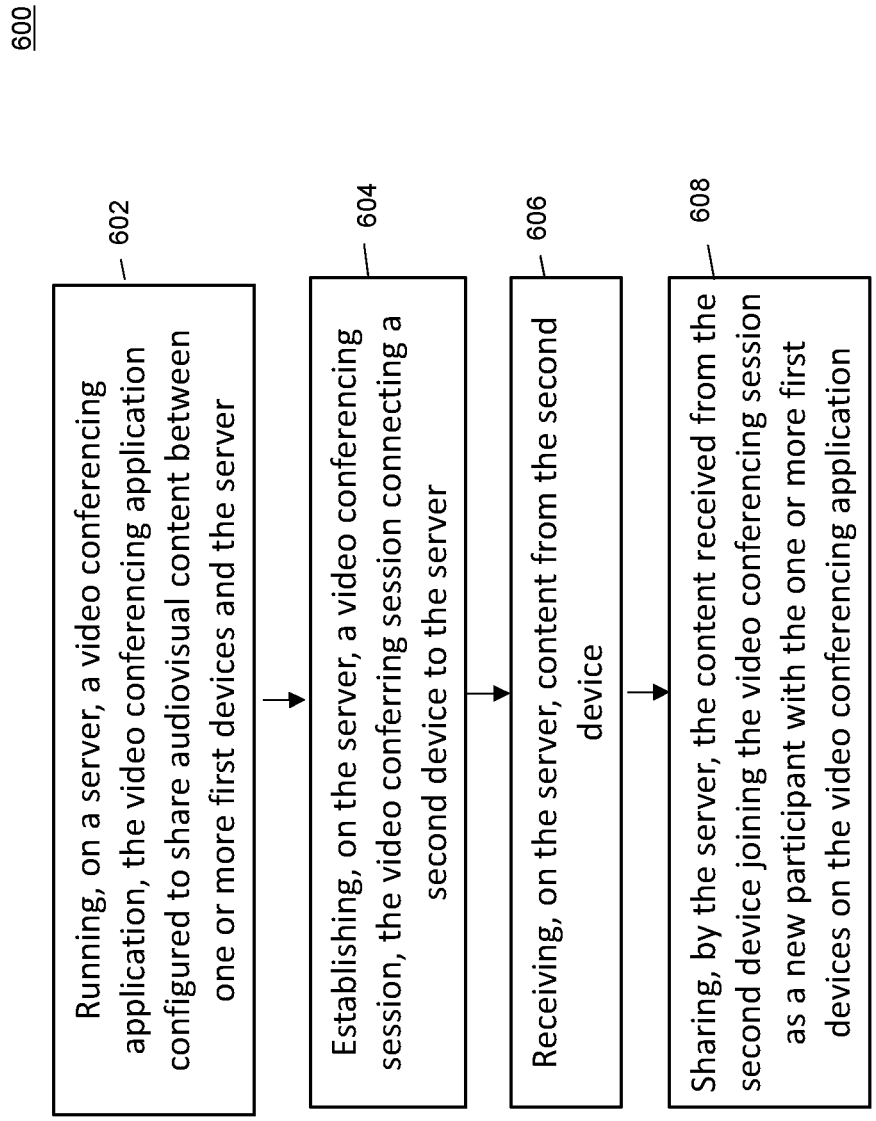
FIG. 6 is a flow chart illustrating a method for sharing content, and more particularly, integrating an Internet of Things (IoT) device and mobile client audiovisual (AV) content into a video conferencing application in accordance with an exemplary embodiment.

FIG. 6 is a flow chart illustrating a method for sharing content, and more particularly, integrating an Internet of Things (IoT) device and mobile client audiovisual (AV) content into a video conferencing application in accordance with an exemplary embodiment. As shown in FIG. 6, a method 600 is disclosed for sharing content, which includes in step 602, running, on a server 110, a video conferencing application, the video conferencing application configured to share audiovisual content between one or more first devices 130a, 130b, 130c and the server 110. In step 604, a video conferencing session 112 is established on the server (or smart media device) 110, the video conferencing session 112 connecting a second device 120a, 130a to the server 110. In step 606, content 132 is received from the second device 120a, 130a on the server 110. In step 608, the content 132 received from the second device 120a, 130a joining the video conferencing session as a new participant, is shared by the server 110 with the one or more first devices 130a, 130b, 130c using the video conferencing application. In accordance with an exemplary embodiment, the content received from the second device 120a, 130a, can be identified in the video conference session by user's device and media type, for example, <users>'s <media type>.

In accordance with an exemplary embodiment, the method further includes discovering, with the server 110, the second device 120a, 130a by scanning for one or more devices 120a, 120b, 120c, 130a that are resident on a local area network (LAN). In accordance with an exemplary embodiment, the second device 120a can be selected, via the server 110, from a list of the one or more devices 120a, 120b, 120c, 130a that are resident on the local area network (LAN) via a video conference application session interface. In addition, a rendering of the content 132 received from the second device 120a, 130a can be controlled via the video conference application session interface on the server 110. For example, the rendering of the content 132 can include a determination of content to be shared and an appearance of the content being shared.

In accordance with an exemplary embodiment, the video conference application session interface can be running on the server 110. In accordance with another embodiment, the video conference application session interface can be running on a third device 130a, 130b, 130c, and wherein the third device 130a, 130b, 130c is in communication with the server 110. The second device 120a, 130a can be an Internet of Things (IoT) device 120a or a mobile client 130a, and wherein the IoT device 120a or the mobile client 130a include smart doorbells, security cameras, webcams, smart phones, tablets, smart watches, Internet Protocol (IP) cameras, or home medical devices. The second device 120a, 130a can be connected to the server via wireless protocol selected from WiFi, Bluetooth, ZigBee RF4CE, and ZigBee.

In accordance with an exemplary embodiment, the one or more first devices 130a, 130b, 130c is a plurality of first devices 130a, 130b, 130c, and the method further includes selectively sharing, via the server 110, the content being shared from the second device 120a, 130a, to only a portion of the plurality of first devices 130a, 130b, 130c, and wherein at least one of the plurality of first devices 130a, 130b, 130c does not receive the content being shared from the second device 120a, 130a. In addition, the one or more first devices 130a, 130b, 130c can be a display device, and via the server 110, the content 132 from second device 120a, 130a, can be displayed on the display device.

Figure 7:
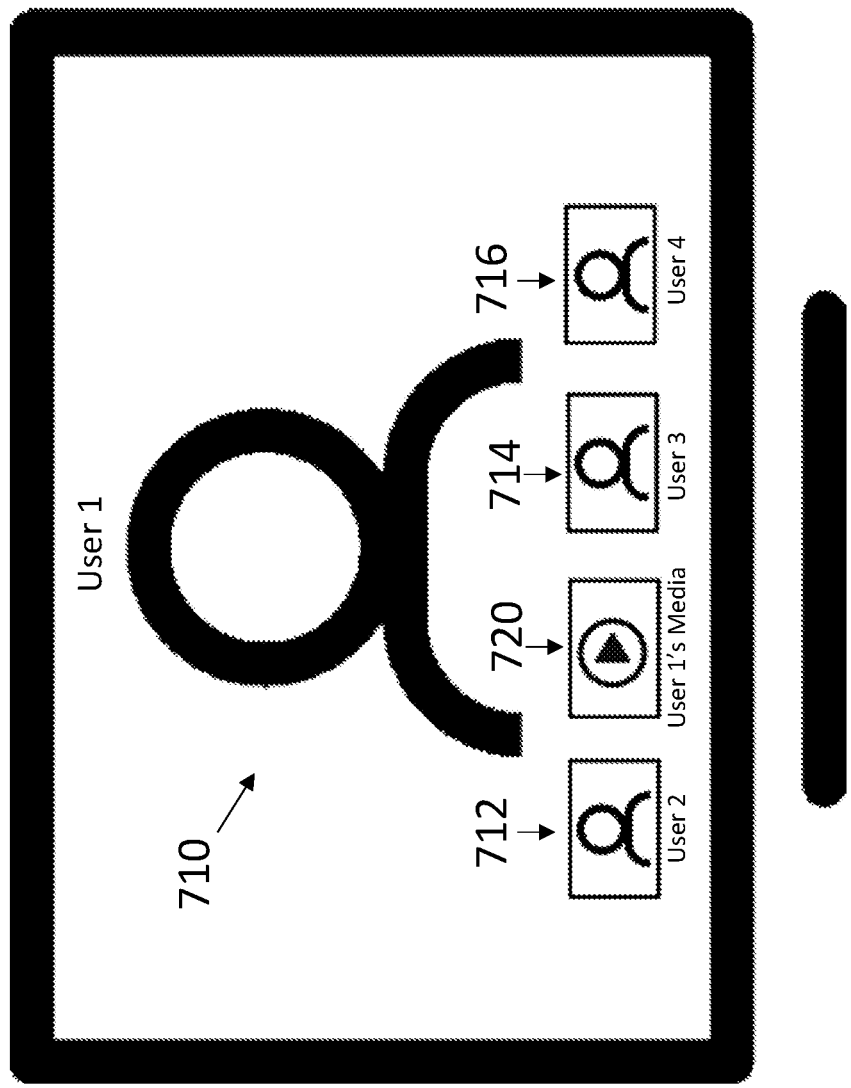
FIG. 7 is an exemplary video conferencing session 700 illustrating where the media content of an Internet of Things (IoT) device is being shared by a user, and wherein the content joins the video conferencing session as a new conference participant.

FIG. 7 is an exemplary video conferencing session 700 illustrating where the media content of an Internet of Things (IoT) device is being shared by a user, and wherein the content from the IoT device 120a or the mobile device 130a joins the video conferencing session as a new participant, for example, a new conference participant. As shown in FIG. 7, the video conferencing session 700 can be shown on a plurality of mobile devices 130a, 130b, 130c, and/or a display 140, and includes a plurality of users or participants 710, 712, 714, 716, and a new participant 720 in the form of media content of an IoT device 120a. In accordance with an exemplary embodiment, the new participant 720 can be identified by a user's name, for example, user 1, and a type of media or media content.

Computer System Architecture

Figure 8:
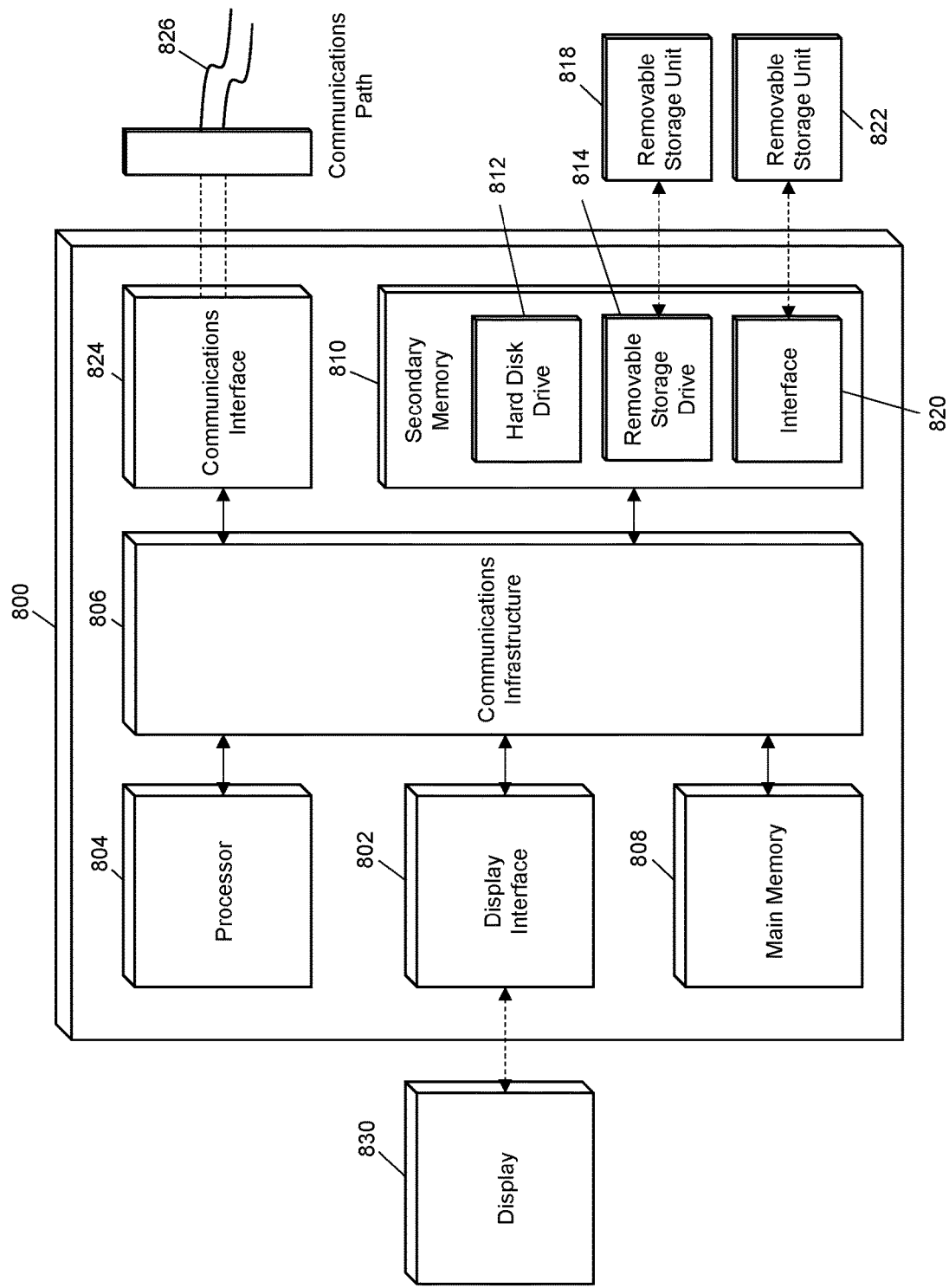
FIG. 8 is an exemplary hardware architecture for an embodiment of a communication device in accordance with an exemplary embodiment.

FIG. 8 illustrates a representative computer system 800 in which embodiments of the present disclosure, or portions thereof, may be implemented as computer-readable code executed on a processor of a computer. For example, the smart media device 110, the IoT devices 120a, 120b, 120c, the mobile clients 130a, 130b, 130c, and the display device 140 of FIGS. 1-7 may be implemented in whole or in part by a computer system 800 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this representative computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc.

Software and data transferred via the communications interface 724 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 1-7, as discussed herein. Accordingly, such computer programs may represent controllers of the computer system 800. Where the present disclosure is implemented using software executed on hardware, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software executed on hardware, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, a method and system for integrating Internet of Things (IOT) devices and mobile client audiovisual into a video conferencing application. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for sharing content, the method comprising:
running, on a server, a video conferencing application, the video conferencing application configured to share audiovisual content between one or more first devices and the server;
establishing, on the server, a video conferencing session, the video conferencing session connecting the one or more first devices to the server;
receiving, on the server from one of the one or more first devices, a user input to connect a second device via a video conference application session interface of the video conferencing application, wherein the second device is located on the same local area (LAN) network as the one of the one or more first devices;
adding, by the server, the second device to the video conferencing session as a new participant;
receiving, on the server, content from the second device; and
sharing, by the server, the content received from the second device with the one or more first devices on the video conferencing application.

2. The method according to claim 1, wherein the receiving the user input to connect the second device further comprises:
discovering, with the server, the second device by scanning for one or more devices that are resident on the local area network (LAN).

3. The method according to claim 2, further comprising:
receiving, via the server, a user selection of the second device from a list of the one or more devices that are resident on the local area network (LAN) via the video conference application session interface.

4. The method according to claim 3, further comprising:
controlling, on the server, a rendering of the content received from the second device via the video conference application session interface, the rendering of the content including one or more of a determination of the content to be shared and an appearance of the content being shared.

5. The method according to claim 3, further comprising:
running, on the server, the video conference application session interface.

6. The method according to claim 3, further comprising:
running the video conference application session interface on a third device, the third device being in communication with the server.

7. The method according to claim 1, wherein the second device is an Internet of Things (IOT) device or a mobile client, and wherein the second device comprises one or more of a smart doorbell, security camera, webcam, smart phone, tablet, smart watch, Internet Protocol (IP) camera, or home medical device.

8. The method according to claim 1, wherein the adding the second device to the video conferencing session further comprises:
  connecting the second device to the server via a wireless protocol selected from WiFi, Bluetooth, ZigBee RF4CE, and ZigBee.

9. The method according to claim 1, wherein the one or more first devices comprises a plurality of first devices, the method further comprising:
  selectively sharing, via the server, the content being shared from the second device to only a portion of the plurality of first devices, and wherein at least one of the plurality of first devices does not receive the content being shared from the second device.

10. The method according to claim 1, wherein the one or more first devices include a display device, the method further comprising:
  displaying, via the server, the content being shared on the display device.

11. A server comprising:
  an operating system; and
  a processor configured to:
    run a video conferencing application, the video conferencing application configured to share audiovisual content between one or more first devices and the server;
    establish a video conferencing session, the video conferencing session connecting the one or more first devices to the server;
    receive, from one of the one or more first devices, a user input to connect a second device via a video conference application session interface of the video conferencing application, wherein the second device is located on the same local area (LAN) network as the one of the one or more first devices;
    add the second device to the video conferencing session as a new participant;
    receive content from the second device; and
    share the content received from the second device with the one or more first devices on the video conferencing application.

12. The server according to claim 11, wherein the receiving the user input to connect the second device further includes the processor configured to:
  discover the second device by scanning for one or more devices that are resident on the local area network (LAN).

13. The server according to claim 12, wherein the processor is further configured to:
  receive a user selection of the second device from a list of the one or more devices that are resident on the local area network (LAN) via the video conference application session interface.

14. The server according to claim 13, wherein the processor is further configured to:
  control a rendering of the content received from the second device via the video conference application session interface, the rendering of the content including one or more of a determination of the content to be shared and an appearance of the content being shared.

15. The server according to claim 11, wherein the second device is an Internet of Things (IOT) device or a mobile client, and wherein second device comprises one or more of a smart doorbell, security camera, webcam, smart phone, tablet, smart watch, Internet Protocol (IP) camera, or home medical device, and further wherein the second device is connected to the server via a wireless protocol selected from WiFi, Bluetooth, ZigBee RF4CE, and ZigBee.

16. A non-transitory computer readable medium having instructions operable to cause one or more processors to perform operations for sharing content, comprising:
  running, on a server, a video conferencing application, the video conferencing application configured to share audiovisual content between one or more first devices and the server;
  establishing, on the server, a video conferencing session, the video conferencing session connecting the one or more first devices to the server;
  receiving, on the server from one of the one or more first devices, a user input to connect a second device via a video conference application session interface of the video conferencing application, wherein the second device is located on the same local area (LAN) network as the one of the one or more first devices;
  adding, by the server, the second device to the video conferencing session as a new participant;
  receiving, on the server, content from the second device; and
  sharing, by the server, the content received from the second device with the one or more first devices on the video conferencing application.

17. The computer readable medium according to claim 16, wherein the receiving the user input to connect the second device further comprises:
  discovering, with the server, the second device by scanning for one or more devices that are resident on the local area network (LAN).

18. The computer readable medium according to claim 17, further comprising:
  receiving, via the server, a user selection of the second device from a list of the one or more devices that are resident on the local area network (LAN) via the video conference application session interface.

19. The computer readable medium according to claim 18, further comprising:
  controlling, on the server, a rendering of the content received from the second device via the video conference application session interface, the rendering of the content including one or more of a determination of the content to be shared and an appearance of the content being shared.

20. The computer readable medium according to claim 16, wherein the one or more first devices comprise a plurality of first devices, further comprising:
  selectively sharing, via the server, the content being shared from the second device to only a portion of the plurality of first devices, and wherein at least one of the plurality of first devices does not receive the content being shared from the second device.

* * * * *